US012457022B2

(12) United States Patent
Raghavan et al.

(10) Patent No.: US 12,457,022 B2
(45) Date of Patent: Oct. 28, 2025

(54) TECHNIQUES FOR SIGNALING PERIODIC AND APERIODIC CHANNEL STATE INFORMATION REFERENCE SIGNAL (CSI-RS) CONFIGURATION PREFERENCE

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/709,320

(22) Filed: Mar. 30, 2022

(65) Prior Publication Data

US 2023/0318674 A1 Oct. 5, 2023

(51) Int. Cl.
  *H04B 7/06* (2006.01)
  *H04L 5/00* (2006.01)
  *H04W 24/10* (2009.01)

(52) U.S. Cl.
  CPC ......... *H04B 7/0626* (2013.01); *H04B 7/0628* (2013.01); *H04L 5/0053* (2013.01); *H04W 24/10* (2013.01)

(58) Field of Classification Search
  CPC ... H04B 7/0626; H04B 7/0628; H04L 5/0053; H04L 5/0096; H04L 5/0057; H04W 24/10
  See application file for complete search history.

(56) References Cited

U.S. PATENT DOCUMENTS

| 2008/0064408 | A1* | 3/2008 | Lindoff | H01Q 3/2605 455/442 |
| 2015/0358132 | A1* | 12/2015 | Wallen | H04W 72/0446 370/329 |
| 2019/0116594 | A1* | 4/2019 | Kwak | H04L 5/0096 |
| 2019/0222279 | A1* | 7/2019 | Xi | H04B 7/0617 |
| 2021/0203387 | A1* | 7/2021 | Park | H04L 5/001 |
| 2021/0376894 | A1* | 12/2021 | Cha | H04B 7/0695 |
| 2021/0392671 | A1* | 12/2021 | Liu | H04L 5/0051 |

OTHER PUBLICATIONS

Omaiye et al, "Adaptive Inter-Beam Granularity and Beamwidth Adjustment for 5G Beam Selection and Management", IEEE (Year: 2021).*

* cited by examiner

*Primary Examiner* — Omer S Mian
(74) *Attorney, Agent, or Firm* — Holland & Hart LLP

(57) ABSTRACT

Methods, systems, and devices for wireless communications are described. A user equipment (UE) may transmit an indication of a recommendation (e.g., a preference) between a set of periodic channel state information reference signals (P-CSI-RS) and a set of aperiodic channel state information reference signals (AP-CSI-RS). For example, the recommendation may be based on conditions at the UE or capabilities of the UE. Based on the indication of the recommendation the UE may receive, from a network entity, control signaling granting the set of AP-CSI-RS or configuring the set of P-CSI-RS. Based on the control signaling and the granted or configured set, the UE may monitor for, and the network entity may transmit, the set of AP-CSI-RS or the set of P-CSI-RS.

20 Claims, 13 Drawing Sheets

TECHNIQUES FOR SIGNALING PERIODIC AND APERIODIC CHANNEL STATE INFORMATION REFERENCE SIGNAL (CSI-RS) CONFIGURATION PREFERENCE

FIELD OF TECHNOLOGY

The following relates to wireless communications, including techniques for signaling periodic and aperiodic channel state information reference signal (CSI-RS) configuration preference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for signaling periodic and aperiodic channel state information reference signal (CSI-RS) configuration preference. For example, the described techniques provide for a user equipment (UE) to indicate a preference between being configured for periodic CSI-RS (P-CSI-RS) and aperiodic CSI-RS (AP-CSI-RS). UEs may have different types of analog or hybrid beamforming capabilities to estimate beam weights, and there may be scenarios where an AP-CSI-RS or a P-CSI-RS is more efficient for a UE to perform adaptive beam weight estimation. By implementing techniques described herein, a UE may indicate a preference or a recommendation between an AP-CSI-RS and a P-CSI-RS configuration. In some cases, a network entity may configure the UE for AP-CSI-RS or P-CSI-RS based on the preference or recommendation from the UE.

A method for wireless communications at a UE is described. The method may include transmitting an indication of a recommendation between a set of periodic CSI-RSs and a set of aperiodic CSI-RSs, receiving control signaling granting the set of aperiodic CSI-RSs or configuring the set of periodic CSI-RSs based on the indication of the recommendation, and monitoring for the set of aperiodic CSI-RSs or the set of periodic CSI-RSs based on the control signaling.

An apparatus for wireless communications at a UE is described. The apparatus may include a processor, memory coupled with the processor, and instructions stored in the memory. The instructions may be executable by the processor to cause the apparatus to transmit an indication of a recommendation between a set of periodic CSI-RSs and a set of aperiodic CSI-RSs, receive control signaling granting the set of aperiodic CSI-RSs or configuring the set of periodic CSI-RSs based on the indication of the recommendation, and monitor for the set of aperiodic CSI-RSs or the set of periodic CSI-RSs based on the control signaling.

Another apparatus for wireless communications at a UE is described. The apparatus may include means for transmitting an indication of a recommendation between a set of periodic CSI-RSs and a set of aperiodic CSI-RSs, means for receiving control signaling granting the set of aperiodic CSI-RSs or configuring the set of periodic CSI-RSs based on the indication of the recommendation, and means for monitoring for the set of aperiodic CSI-RSs or the set of periodic CSI-RSs based on the control signaling.

A non-transitory computer-readable medium storing code for wireless communications at a UE is described. The code may include instructions executable by a processor to transmit an indication of a recommendation between a set of periodic CSI-RSs and a set of aperiodic CSI-RSs, receive control signaling granting the set of aperiodic CSI-RSs or configuring the set of periodic CSI-RSs based on the indication of the recommendation, and monitor for the set of aperiodic CSI-RSs or the set of periodic CSI-RSs based on the control signaling.

Some examples of the method, apparatuses, and non-transitory computer-readable medium described herein may further include operations, features, means, or instructions for transmitting a message indicating a UE capability associated with adaptive beam weight estimation.

In some examples of the method, apparatuses, and non-transitory computer-readable medium described herein, the UE capability may be based on a power availability of the UE, a thermal overhead associated with the UE, mobility conditions of the UE, channel conditions for a wireless channel between the UE and a network entity, or any combination thereof.

In some examples of the method, apparatuses, and non-transitory computer-readable medium described herein, the UE capability includes a first capability to perform beam weight estimation for a set of multiple antenna elements of an antenna group, a second capability to perform beam weight estimation for antenna elements of the set of multiple antenna elements individually, or both.

In some examples of the method, apparatuses, and non-transitory computer-readable medium described herein, the UE capability may be based on a quantization mapping in a range of estimation error.

In some examples of the method, apparatuses, and non-transitory computer-readable medium described herein, the recommendation between the set of periodic CSI-RSs and the set of aperiodic CSI-RSs may be based on the UE capability.

In some examples of the method, apparatuses, and non-transitory computer-readable medium described herein, transmitting the indication of the recommendation may include operations, features, means, or instructions for indicating a quantity of reference signals for the set of periodic CSI-RSs, a periodicity for the set of periodic CSI-RSs, frequency resources for the set of periodic CSI-RSs, or any combination thereof.

In some examples of the method, apparatuses, and non-transitory computer-readable medium described herein, transmitting the indication of the recommendation may include operations, features, means, or instructions for indicating a quantity of reference signals for the set of aperiodic CSI-RSs, frequency resources for the set of aperiodic CSI-RSs, or both.

Some examples of the method, apparatuses, and non-transitory computer-readable medium described herein may further include operations, features, means, or instructions for receiving a grant for uplink resources for a set of sounding reference signals (SRSs) based on the indication of the recommendation of the set of aperiodic CSI-RSs and transmitting the set of sounding reference signals on the uplink resources based on the grant.

A method for wireless communications at a network entity is described. The method may include receiving an indication of a UE recommendation between a set of periodic CSI-RSs and a set of aperiodic CSI-RSs, transmitting control signaling granting the set of aperiodic CSI-RSs or configuring the set of periodic CSI-RSs based on the indication of the UE recommendation, and transmitting the set of aperiodic CSI-RSs or the set of periodic CSI-RSs based on the control signaling.

An apparatus for wireless communications at a network entity is described. The apparatus may include a processor, memory coupled with the processor, and instructions stored in the memory. The instructions may be executable by the processor to cause the apparatus to receive an indication of a UE recommendation between a set of periodic CSI-RSs and a set of aperiodic CSI-RSs, transmit control signaling granting the set of aperiodic CSI-RSs or configuring the set of periodic CSI-RSs based on the indication of the UE recommendation, and transmit the set of aperiodic CSI-RSs or the set of periodic CSI-RSs based on the control signaling.

Another apparatus for wireless communications at a network entity is described. The apparatus may include means for receiving an indication of a UE recommendation between a set of periodic CSI-RSs and a set of aperiodic CSI-RSs, means for transmitting control signaling granting the set of aperiodic CSI-RSs or configuring the set of periodic CSI-RSs based on the indication of the UE recommendation, and means for transmitting the set of aperiodic CSI-RSs or the set of periodic CSI-RSs based on the control signaling.

A non-transitory computer-readable medium storing code for wireless communications at a network entity is described. The code may include instructions executable by a processor to receive an indication of a UE recommendation between a set of periodic CSI-RSs and a set of aperiodic CSI-RSs, transmit control signaling granting the set of aperiodic CSI-RSs or configuring the set of periodic CSI-RSs based on the indication of the UE recommendation, and transmit the set of aperiodic CSI-RSs or the set of periodic CSI-RSs based on the control signaling.

Some examples of the method, apparatuses, and non-transitory computer-readable medium described herein may further include operations, features, means, or instructions for receiving a message indicating a UE capability associated with adaptive beam weight estimation.

In some examples of the method, apparatuses, and non-transitory computer-readable medium described herein, the UE capability may be based on a power availability of a UE, a thermal overhead associated with the UE, mobility conditions of the UE, channel conditions for a wireless channel between the UE and the network entity, or any combination thereof.

In some examples of the method, apparatuses, and non-transitory computer-readable medium described herein, the UE capability includes a first capability to perform beam weight estimation for a set of multiple antenna elements of an antenna group, a second capability to perform beam weight estimation for antenna elements of the set of multiple antenna elements individually, or both.

In some examples of the method, apparatuses, and non-transitory computer-readable medium described herein, the UE capability may be based on a quantization mapping in a range of estimation error.

In some examples of the method, apparatuses, and non-transitory computer-readable medium described herein, the UE recommendation for the set of periodic CSI-RSs or the set of aperiodic CSI-RSs may be based on the UE capability.

In some examples of the method, apparatuses, and non-transitory computer-readable medium described herein, receiving the indication of the UE recommendation may include operations, features, means, or instructions for receiving an indication of a quantity of reference signals for the set of periodic CSI-RSs, a periodicity for the set of periodic CSI-RSs, frequency resources for the set of periodic CSI-RSs, or any combination thereof.

In some examples of the method, apparatuses, and non-transitory computer-readable medium described herein, receiving the indication of the UE recommendation may include operations, features, means, or instructions for receiving an indication of a quantity of reference signals for the set of aperiodic CSI-RSs, frequency resources for the set of aperiodic CSI-RSs, or both.

Some examples of the method, apparatuses, and non-transitory computer-readable medium described herein may further include operations, features, means, or instructions for transmitting a grant for uplink resources for one or more SRSs based on the indication of the UE recommendation for the set of aperiodic CSI-RSs and receiving the one or more sounding reference signals on the uplink resources based on the grant.

DETAILED DESCRIPTION

Figure 1:
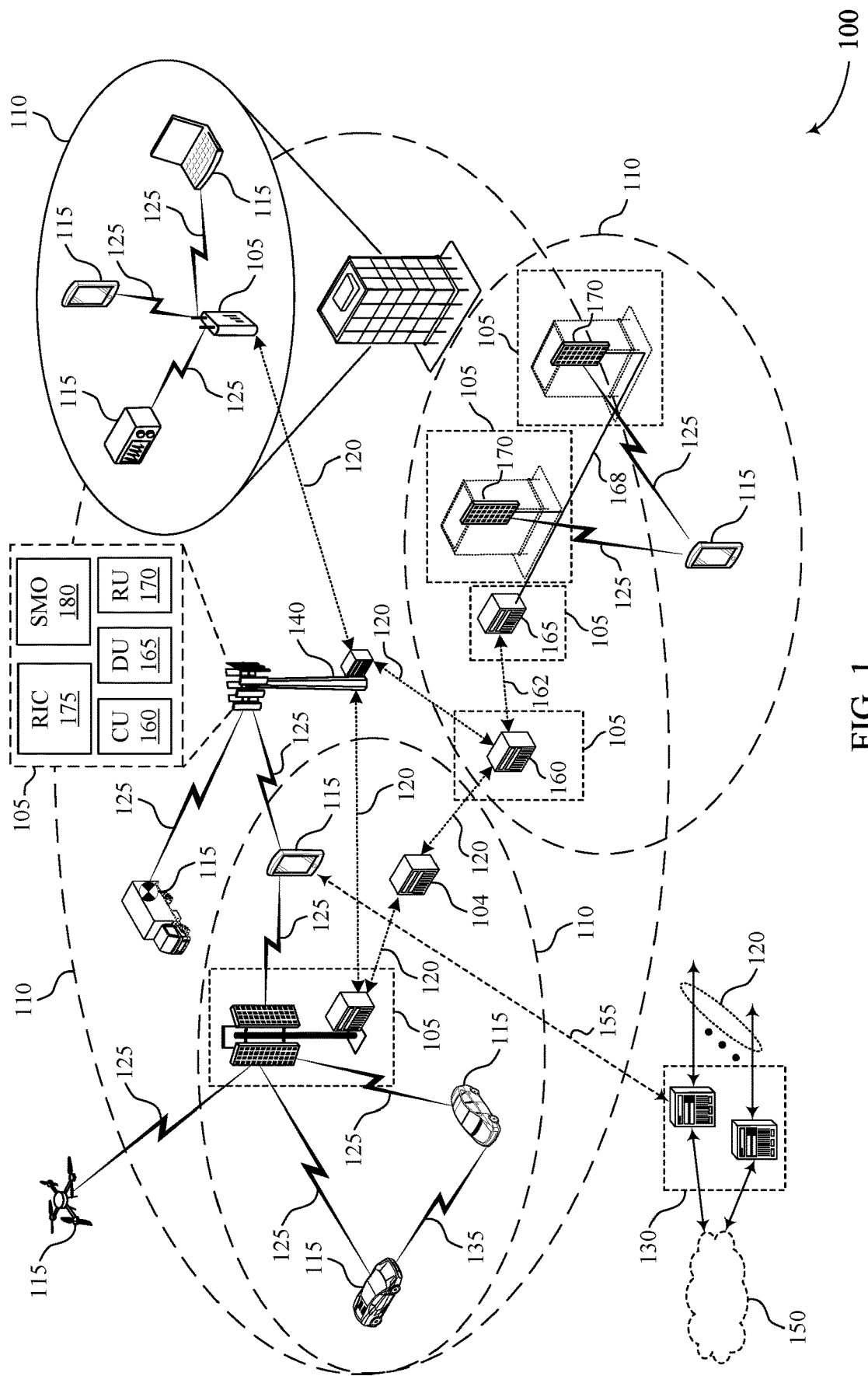
FIG. 1 illustrates an example of a wireless communications system that supports techniques for signaling periodic and aperiodic channel state information reference signal (CSI-RS) configuration preference in accordance with one or more aspects of the present disclosure.

In some wireless communications systems, a network entity may implement a channel state information reference signal (CSI-RS) configuration for beamforming vector or precoding matrix updating at a user equipment (UE), so as to allow the UE to tune antenna elements. The network entity may transmit CSI-RSs to the UE, and the UE may measure the CSI-RS and perform the beamformer or precoder updates based on the measurements. The network entity may configure the CSI-RS as periodic CSI-RS (P-CSI-RS) or aperiodic CSI-RS (AP-CSI-RS). In some cases, P-CSI-RS may have higher overhead, as the signals may be repeated at a configured periodicity, but the periodic repetition may provide enhanced precoder updating when channel conditions are dynamic (e.g., the UE is mobile). In some cases, AP-CSI-RS may be configured as changing channel conditions arise at the UE, which may avoid a constant overhead. However, the network entity may determine whether to use P-CSI-RS or AP-CSI-RS based on the network conditions at the network entity.

In some examples, a UE may be capable of different types of analog or hybrid beamforming capabilities for updating beam weights. In some cases, based on the capabilities of the UE or different conditions at the UE, either P-CSI-RS or AP-CSI-RS may result in increased efficiency in beam weight updating at the UE. However, as the network entity makes the decision between AP-CSI-RS or P-CSI-RS in some current systems, UEs in these current systems may be configured with P-CSI-RS or AP-CSI-RS based on conditions at the network entity, regardless of whether P-CSI-RS or AP-CSI-RS would result in more efficient beam weight updating at the UE.

Wireless communications systems described herein provide techniques for enhanced beam weight estimation, by enabling a UE to indicate a preference between P-CSI-RS and AP-CSI-RS. In some cases, a UE may indicate a capability for adaptive beam weight estimation, such as whether the UE can support block estimation techniques (e.g., updating beam weight estimates for a periodically repeated block of reference signals) or sliding window estimation techniques (e.g. sequentially updating a beam weight estimate based on individual reference signals that occur aperiodically).

The UE may also indicate a preference or recommendation between a P-CSI-RS configuration and an AP-CSI-RS configuration. In some cases, the preference or recommendation may be based on the UE capability. In some cases, the UE may indicate preferences for configurations of the P-CSI-RS configuration or AP-CSI-RS configuration, such as indicating a preference for a frequency of the P-CSI-RS or the number of AP-CSI-RS. In some cases, the network entity may configure P-CSI-RS or AP-CSI-RS based on the UE indication of capability and preference. Thus, the UE may have an input on a configuration for CSI-RS based on conditions at the UE, and the network entity may select between a P-CSI-RS configuration and an AP-CSI-RS based on more than network conditions at the network entity. By considering the UE recommendation or preference for a CSI-RS configuration, the UE may increase power savings and performance by being configured with a CSI-RS configuration which is more efficient for the beamformer or precoder updating techniques supported by the UE.

Aspects of the disclosure are initially described in the context of wireless communications systems. Aspects of the disclosure are also described in the context of system diagrams and process flow diagrams. Aspects of the disclosure are further illustrated by and described with reference to apparatus diagrams, system diagrams, and flowcharts that relate to techniques for signaling periodic and aperiodic CSI-RS configuration preference.

FIG. 1 illustrates an example of a wireless communications system 100 that supports techniques for signaling periodic and aperiodic CSI-RS configuration preference in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for signaling periodic and aperiodic CSI-RS configuration preference as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The network entity 105 may implement a CSI-RS configuration for beamformer or precoder updating at the UE 115, such as for the UE 115 to tune antenna elements. The network entity may transmit CSI-RSs to the UE 115, and the UE 115 may measure the CSI-RS and perform the beamformer or precoder updates based on the measurements. The network entity may configure the CSI-RS as periodic CSI-RS or aperiodic CSI-RS.

In some examples, a UE 115 may be capable of different types of analog or hybrid beamforming capabilities for updating beam weights. In some cases, based on the capabilities of the UE 115 or different conditions at the UE 115, either P-CSI-RS or AP-CSI-RS may result in increased efficiency in beam weight updating at the UE. However, the network entity 105 may make the decision between AP-CSI-RS or P-CSI-RS based on conditions at the network entity, regardless of whether P-CSI-RS or AP-CSI-RS would result in more efficient beam weight updating at the UE 115.

The UE 115 may indicate a recommendation (e.g., a preference) between P-CSI-RS and AP-CSI-RS. In some cases, a UE 115 may indicate a capability for adaptive beam weight estimation, such as whether the UE 115 can support block estimation techniques (e.g., updating beam weight estimates for a periodically repeating block of reference signals) or sliding window estimation techniques (e.g. sequentially updating a beam weight estimate for individual reference signals that occur aperiodically). The UE 115 may also indicate a preference or recommendation between a P-CSI-RS configuration and an AP-CSI-RS configuration. In some cases, the preference or recommendation may be based on a capability of the UE 115.

In some cases, the UE 115 may indicate preferences for configurations of the P-CSI-RS configuration or AP-CSI-RS configuration, such as indicating a preference for a frequency of the P-CSI-RS or the number of AP-CSI-RS. In some cases, the network entity 105 may configure P-CSI-RS or AP-CSI-RS based on the indication of capability and preference of the UE 115. Thus, the UE 115 may have an input on a configuration for CSI-RS based on conditions at the UE 115, and the network entity 105 may select between a P-CSI-RS configuration and an AP-CSI-RS based on more than network conditions at the network entity 105. By considering a recommendation or preference for a CSI-RS configuration of a UE 115, the UE 115 may increase power savings and performance by being configured with a CSI-RS configuration which is more efficient for the beamformer or precoder updating techniques supported by the UE 115.

Figure 2:
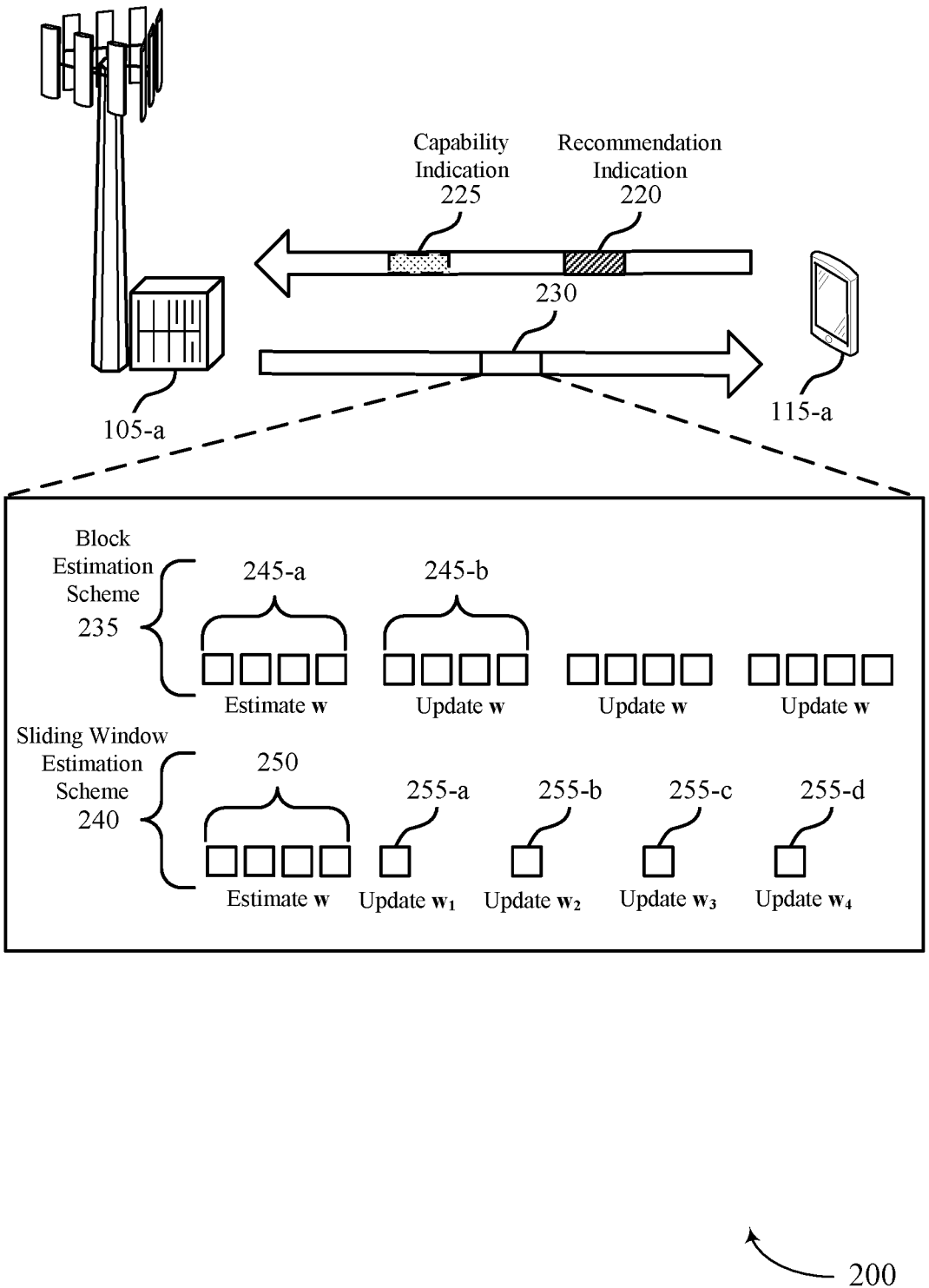
FIG. 2 illustrates an example of a wireless communications system that supports techniques for signaling periodic and aperiodic CSI-RS configuration preference in accordance with one or more aspects of the present disclosure.

FIG. 2 illustrates an example of a wireless communications system 200 that supports techniques for signaling periodic and aperiodic CSI-RS configuration preference in accordance with one or more aspects of the present disclosure. The system 200 may include a network entity 105-*a* and a UE 115-*a*, which may be examples of a network entity 105 and a UE 115 described with reference to FIG. 1.

In some cases, the network entity 105-*a* may configure CSI-RS 230 for beamformer or precoder updating at the UE 115-*a* (e.g., tuning antenna elements). In some cases, the network entity 105-*a* may configure the CSI-RS 230 as periodic (e.g., P-CSI-RS). P-CSI-RS may result in higher overhead based on repetition at the configured periodicity but may provide enhanced precoder updating when there are dynamic channel conditions, such as if the UE 115-*a* is mobile. In some cases, the network entity 105-*a* may configure CSI-RS 230 aperiodically (e.g., AP-CSI-RS). AP-CSI-RS may be configured as varying channel conditions arise at the UE 115, such that the UE 115 may report changes in the channel conditions in order to perform beam management or maintenance or beam failure recovery to find a best or better beam for the changed channel conditions. As such, AP-CSI-RS may have lower signaling overhead compared to P-CSI-RS, as AP-CSI-RS may not have repeating reserved resources.

In some systems, a network entity 105 may determine the configuration for CSI-RS based on conditions at the network entity 105. For example, if the network entity 105 determines to use AP-CSI, the network entity 105 may transmit downlink control information to trigger AP-CSI at the UE 115. In another example, if the network entity 105 configures P-CSI in RRC, the UE 115 may remain in the P-CSI configuration until the network entity 105 configures a new P-CSI or AP-CSI.

The wireless communications system 200 may support adaptive beam weights. For example, the UE 115-*a* may adjust beam weight adaptively using a CSI-RS 250. For example, adaptive beam weights may tailor to channel conditions such as fading or blockage rather than beam weights preconfigured based on desired properties (e.g., steering direction of main lobes, gains of main lobes, side lobe directions and levels, or any combination thereof). For example, in other systems, beam weights may be predetermined from a fixed or static analog beamforming codebook. Adaptive beam weights may provide more flexibility for beam management based on actual channel conditions and measurements performed by wireless devices in the wireless communications system 200.

The wireless communications system 200 may support multiple techniques for adaptive beam weight estimations, such as a block estimation scheme 235, a sliding window estimation scheme 240, or an adaptive beam weight estimation scheme which implements techniques from both the block estimation scheme 235 and the sliding window estimation scheme 240. In some cases, the UE 115-*a* may update adaptive beam weight estimation using a block estimation scheme 235. In some examples, the block estimation scheme 235 may be implemented using a set of P-CSI-RS 245. For example, in the block estimation scheme 235, the network entity 105-*a* may transmit an initial number of reference signals (e.g., a block of reference signals or a set of P-CSI-RS 245-*a*) which may be repeated periodically (e.g., at a configured periodicity). The UE 115-*a* may update beam weight estimation (e.g., determine a new beam weight estimate) for the block of reference signals with each transmission of the set of P-CSI-RS 245. For example, at a second instance or iteration of the P-CSI-RS, the UE 115 may perform adaptive beam weight estimation for all antenna elements based on the set of P-CSI-RS 245-b.

In some cases, the UE 115-*a* may update adaptive beam weights using a sliding window estimation scheme 240. In some examples, the sliding window estimation scheme 240 may be implemented based on aperiodic CSI-RS. For example, in the sliding window estimation scheme 240, the network entity 105-*a* may transmit an initial number of reference signals, such as a set 250 of reference signals. The network entity 105-*a* may aperiodically transmit reference signals (e.g., aperiodic reference signals 255) to the UE 115-*a* for the UE 115-*a* to perform adaptive beam weight estimation based on the reference signals. The UE 115-*a* may sequentially update beam weights (e.g., of beamforming vectors $w_1$, $w_2$, $w_3$, and $w_4$) as the Network Entity 105-*a* aperiodically transmits reference signals.

For example, if the UE 115-*a* is using four antenna elements, the UE 115-*a* may determine beam weights for all four antenna elements based on the set 250 of reference signals. As the network entity 105-*a* transmits aperiodic reference signals 255 to the UE 115-*a*, the UE 115-*a* may update individual beam weights for antenna elements based on an aperiodic reference signal 255. For example, the UE 115-*a* may update a first beam weight for a first antenna element based on aperiodic reference signal 255-*a*, update a second beam weight for a second antenna element based on aperiodic reference signal 255-*b*, and determine similar updates for other beam weight of other antenna elements based on aperiodic reference signal 255-*c* and aperiodic reference signal 255-*d*.

In some cases, UE 115-*a* may support (e.g., have capabilities for) a block estimation scheme, a sliding window estimation scheme, or a combination thereof. For example, the UE 115-*a* may be capable of an adaptive beam weight estimation scheme which has elements of both the block estimation scheme 235 and the sliding window estimation scheme 240, where the network entity 105-*a* may transmit more than one reference signal at a time in a sliding window estimation scheme 240, or the UE 115-*a* is configured for fewer P-CSI-RS than antenna elements.

Additionally, or alternatively, the UE 115-*a* may have preferences regarding the use of a block estimation scheme or a sliding window estimation scheme (e.g., based on conditions at the UE 115-*a*). For example, the block estimation scheme 235 (e.g., adaptive beam weight estimation via independent blocks of reference signals) may facilitate increased quality of estimation (e.g., from diversity of reference signals transmitted periodically) in a stationary setting (e.g., when the UE is not mobile). However, a block estimation scheme 235 may increase power consumption at the UE 115-*a* (e.g., based on constant overhead signaling). In a channel environment that changes (e.g., the UE is mobile or local scatterers who dynamically change), using new blocks for updating beam weight estimation may lead to decreased performance, as the UE 115-*a* may not store previous estimations (e.g., the estimation is memoryless). The sliding window estimation scheme 240 may increase estimation quality in a tracking scenario and decrease power consumption (e.g., based on the smaller number of reference signals transmitted). Thus, conditions at the UE 115-*a* (e.g., the UE is mobile, quality of estimation is significant, the UE 115-*a* is operating under low power conditions) may impact UE 115-*a* preferences and benefits of different estimation schemes.

Although a UE 115 may have different types of analog or hybrid beamforming capabilities in estimating beam weights (e.g., block estimation scheme 235 or sliding window estimation scheme 240), some network entities 105 may base the CSI-RS configuration on conditions at the network entity 105. As such, the UEs 115 in some current systems may not be able to take measurements using a preferred method, despite the preferred method resulting in more efficient power utilization, reduced overhead, or more reliable beam management at the UE 115.

The wireless communications system 200 may support techniques for a UE 115, such as the UE 115-*a*, to indicate a preference or recommendation between being configured for P-CSI-RS or AP-CSI-RS. For example, the UE 115-*a* may transmit a recommendation indication 220 to the network entity 105-*a*. The recommendation indication 220 may indicate a preference between AP-CSI-RS and P-CSI-RS. In some examples, the recommendation indication 220 may be an explicit indication of UE 115-*a* preference between AP-CSI-RS or P-CSI-RS.

In some cases, the UE 115-*a* may indicate a preference or recommendation for a configuration of P-CSI-RS or AP-CSI-RS. For example, the recommendation indication 220 may indicate a preference for a number or frequency of P-CSI-RS, such as the number of reference signals included in the set of reference signals 245 for the block estimation scheme 235 or the frequency of the periodic transmission of the reference signals, or both. In another example, the recommendation indication 220 may indicate a number of AP-CSI-RS, such as how many reference signals are aperiodically transmitted, or requesting certain symbols or symbol indexes of a slot for the AP-CSI-RS to be transmitted in. In some cases, the recommendation indication 220 may indicate the block estimation scheme 235 for beam weight estimation, which may indicate that the UE 115-*a* prefers P-CSI-RS. Additionally, or alternatively, the recommendation indication 220 may indicate the sliding window estimation scheme 240 for beam weight estimation, which may indicate that the UE 115-*a* prefers AP-CSI-RS.

In some cases, the UE 115-*a* may transmit a capability indication 225, which may indicate adaptive beam weight estimation capabilities of the UE 115-*a*. For example, the capability indication 225 may indicate UE 115-*a* capability for block estimation scheme 235, sliding window estimation scheme 240, or both, or a beam weight estimation scheme which is between the block estimation scheme 235 and the sliding window estimation scheme 240. In some examples, the capability indication 225 may indicate a configured quantization mapping in the range of estimation error. In some example, the capability indication 225 may dynamically indicate capability as a function of power available at the UE 115-*a*, thermal overhead associated with the UE 115-*a*, mobility conditions of the UE 115-*a*, or the sense or dynamics of the channel environment.

In some cases, based on the recommendation indication 220 and the indicated preference of UE 115-*a*, the network entity 105-*a* may configure the UE 115-*a* for P-CSI-RS, AP-CSI-RS or sounding reference signals (SRS) (e.g., for uplink). For example, the UE indication of preference may be used by the network entity 105-*a* to grant P-CSI-RS, AP-CSI-RS, or SRS to the UE 115-*a*. For example, the network entity 105-*a* may determine that P-CSI-RS is more efficient for adaptive beam weight estimation at the UE 115-*a* based on the recommendation indication 220 and configure the UE 115-*a* for P-CSI-RS, even if channel conditions at the network entity 105-*a* would correspond to AP-CSI-RS in other systems. In other cases, the network entity 105-*a* may not configure the UE 115-*a* with the preferred CSI configuration (e.g., based on other capabilities of UE 115-*a* or preferences of network entity 105-*a*).

Based on the techniques described herein which enable the UE 115-*a* to indicate a preference or recommendation between AP-CSI-RS and P-CSI-RS, adaptive beam weight estimation may not be based only on conditions at the network entity 105-*a*. As the beam weight estimation capabilities of UE 115-*a* increase (e.g., diversify), the ability of the UE to indicate a preference for AP-CSI-RS or P-CSI-RS may be significant.

Figure 3:
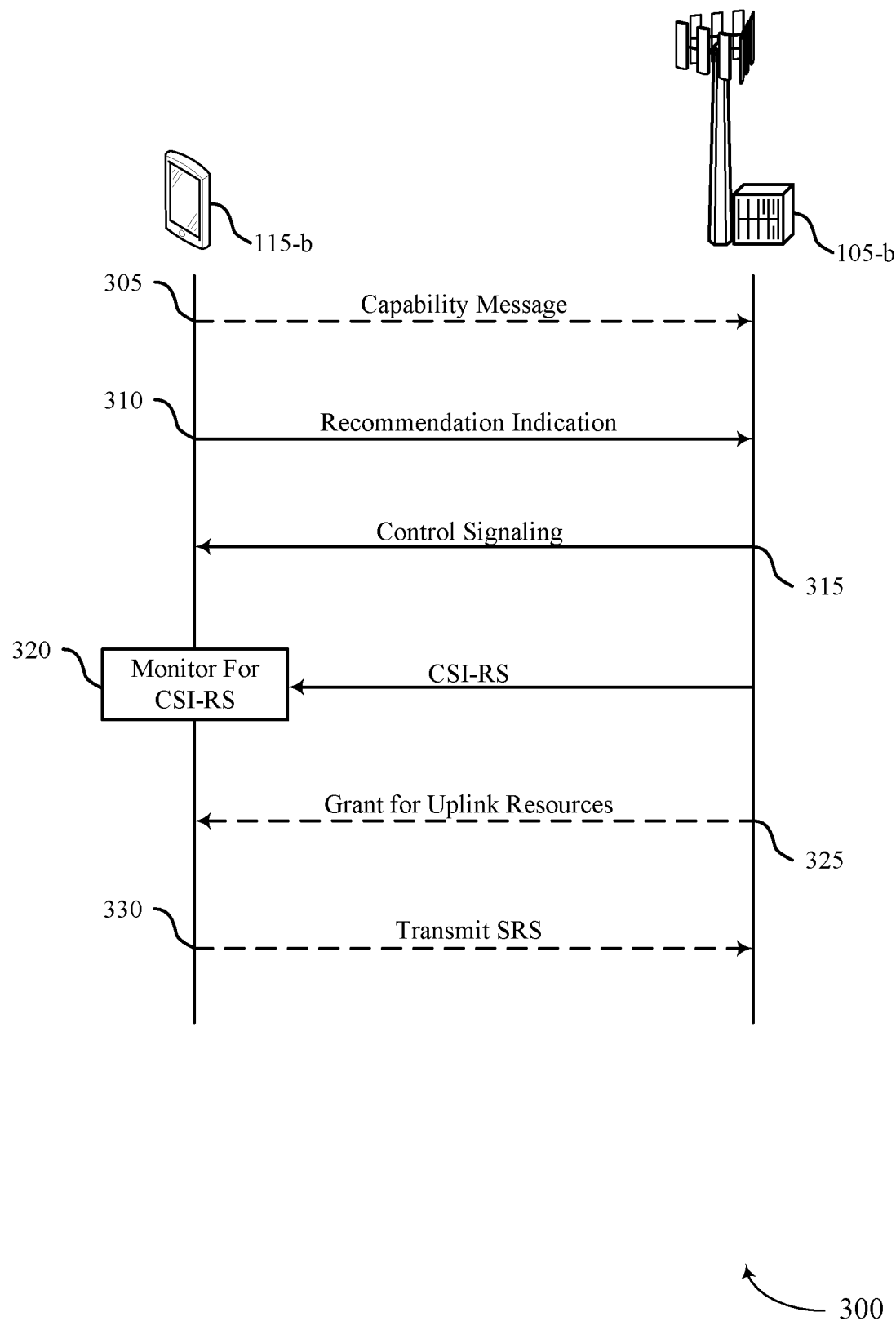
FIG. 3 illustrates an example of a process flow that supports techniques for signaling periodic and aperiodic CSI-RS configuration preference in accordance with one or more aspects of the present disclosure.

FIG. 3 illustrates an example of a process flow 300 that supports techniques for signaling periodic and aperiodic CSI-RS configuration preference in accordance with one or more aspects of the present disclosure. The process flow 300 may implement various aspects of the present disclosure described with reference to FIGS. 1 and 2. The process flow may include a UE 115-*b* and a network entity 105-*b* which may be examples of a UE 115 and a network entity 105 as described with reference to FIGS. 1 and 2.

In some cases, at 305, the UE 115-*b* may transmit, and the network entity 105-*b* may receive, a capability message as described with reference to FIG. 2. The capability message may indicate a UE capability (e.g., of the UE 115-*b*) associated with adaptive beam weight estimation. For example, the UE 115-*b* may indicate a capability for beam weight estimation schemes, such as a capability to support a block estimation scheme or a sliding window estimation scheme, or an adaptive beam weight estimation scheme in between or which includes aspects of both the block estimation scheme and the sliding window estimation scheme.

In some cases, the UE capability may be based on a power availability of the UE 115-*b*, a thermal overhead associated with the UE 115-*b*, mobility conditions of the UE 115-*b*, channel conditions for a wireless channel (e.g., a wireless connection) between the UE 115-*b* and the network entity 105-*b*, or any combination thereof. For example, the UE 115-*b* may dynamically indicate or declare capability based on any of these conditions or any combination thereof. In some cases, the UE capability may include a first capability to perform beam weight estimation for multiple antenna elements of an antenna as a group or block (e.g., block estimation scheme as described with reference to FIG. 2), a second capability to perform beam weight estimation for antenna elements of the multiple antenna elements individually (e.g., sliding window estimation scheme as described with reference to FIG. 2), or both (e.g., a combination of both). In some cases, the UE capability may be based on a quantization mapping in a range of estimation error.

At 310, the UE 115-*b* may transmit, and the network entity 105-*b* may receive, an indication of a recommendation between a set of P-CSI-RSs and a set of AP-CSI-RSs. For example, the UE 115-*b* may transmit a recommendation indication as described with reference to FIG. 2, which may be an indication of a recommendation or preference between being configured for P-CSI-RS and AP-CSI-RS, such as for adaptive beam weight estimation. In some cases, the recommendation between the set of P-CSI-RS and the set of AP-CSI-RS may be based on the UE 115-*b* capability.

In some cases, the indication of the recommendation may indicate a quantity of reference signals for the set of P-CSI-RS (e.g., the number of reference signals transmitted by the network entity 105-*b* in a group for a block estimation scheme), a periodicity for the set of P-CSI-RS, frequency resources for the set of P-CSI-RS (e.g., the frequency with which the network entity 105-*b* transmits the block of reference signals), or any combination thereof. In some cases, the recommendation indication may indicate a quantity of reference signals for the set of AP-CSI-RS (e.g., the number of reference signals the network entity 105-*b* transmits at a time in a sliding window estimation scheme), frequency resource for the set of AP-CSI-RS, or both.

At 315, the network entity 105-*b* may transmit, and the UE 115-*b* may receive, control signaling granting the set of AP-CSI-RS or configuring the set of P-CSI-RS based on the indication of the recommendation. For example, the network entity 105-*b* may grant or configure a type of CSI-RS which the UE 115-*a* recommended at 310.

At 320, the UE 115-*b* may monitor for, and the network entity 105-*b* may transmit, the set of AP-CSI-RS or the set of P-CSI-RS based on the control signaling. For example, the UE 115-*b* may monitor for CSI-RS according to the control signaling and may perform adaptive beam weight estimation according to a block estimation scheme (e.g., for P-CSI-RS), a sliding window estimation scheme (e.g., for AP-CSI-RS), or any combination thereof.

In some cases (e.g., if the control signaling grants the set of AP-CSI-RS), at 325, the network entity 105-*b* may transmit, and the UE 115-*b* may receive, a grant for uplink resources for a set of SRSs based on the recommendation indication of the set of AP-CSI-RS. In some cases, at 330, the UE 115-*b* may transmit, and the network entity 105-*b* may receive, the set of SRSs on the uplink resources based on the grant.

Figure 4:
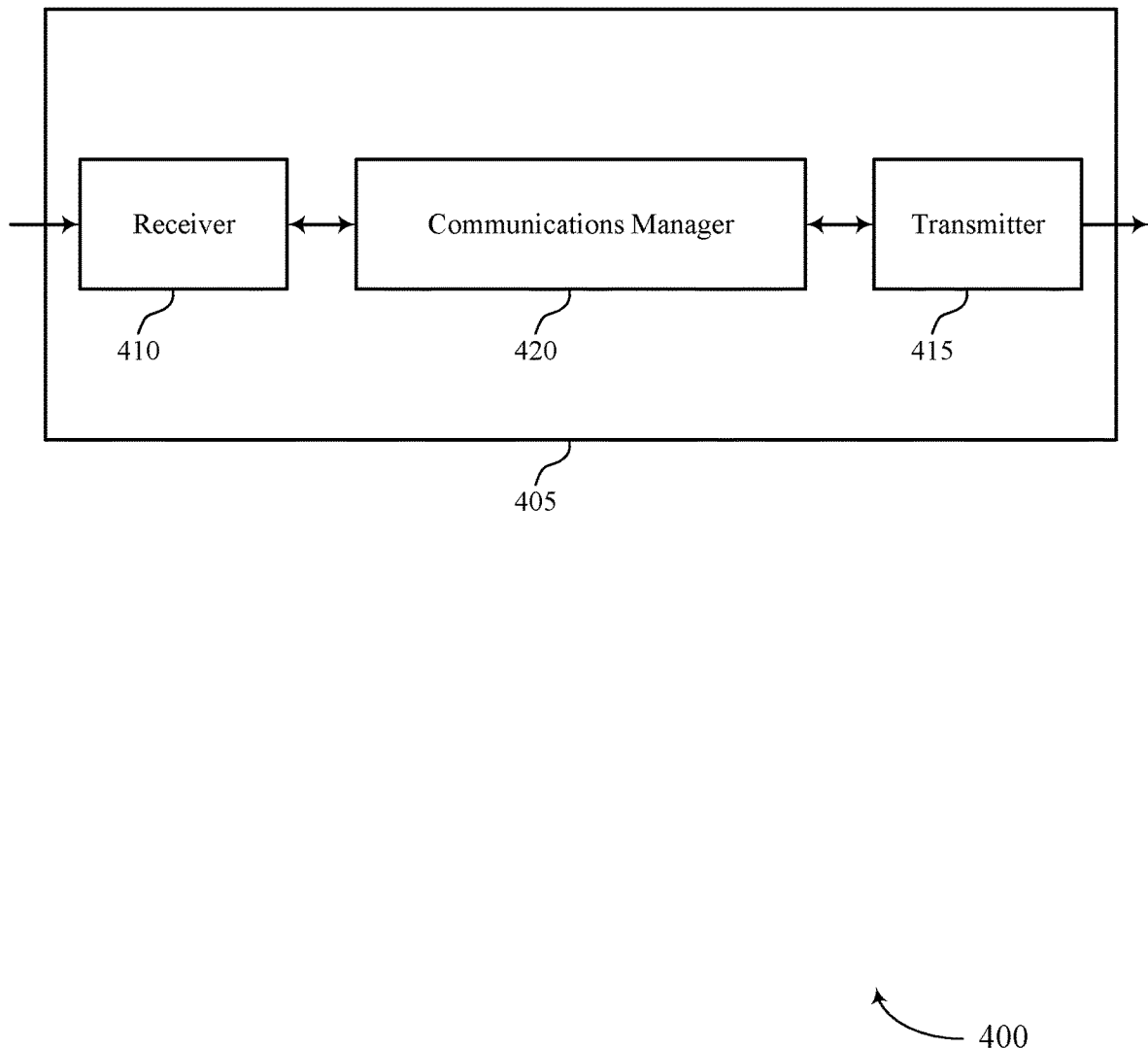
FIGS. 4 and 5 show block diagrams of devices that support techniques for signaling periodic and aperiodic CSI-RS configuration preference in accordance with one or more aspects of the present disclosure.

FIG. 4 shows a block diagram 400 of a device 405 that supports techniques for signaling periodic and aperiodic CSI-RS configuration preference in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for signaling periodic and aperiodic CSI-RS configuration preference). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for signaling periodic and aperiodic CSI-RS configuration preference). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for signaling periodic and aperiodic CSI-RS configuration preference as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for transmitting an indication of a recommendation between a set of periodic CSI-RSs and a set of aperiodic CSI-RSs. The communications manager 420 may be configured as or otherwise support a means for receiving control signaling granting the set of aperiodic CSI-RSs or configuring the set of periodic CSI-RSs based on the indication of the recommendation. The communications manager 420 may be configured as or otherwise support a means for monitoring for the set of aperiodic CSI-RSs or the set of periodic CSI-RSs based on the control signaling.

By including or configuring the communications manager 420 in accordance with examples as described herein, the device 405 (e.g., a processor controlling or otherwise coupled with the receiver 410, the transmitter 415, the communications manager 420, or a combination thereof)

may support techniques for enhanced beamformer or precoder updating, reduced power consumption, and more efficient utilization of communication resources.

Figure 5:
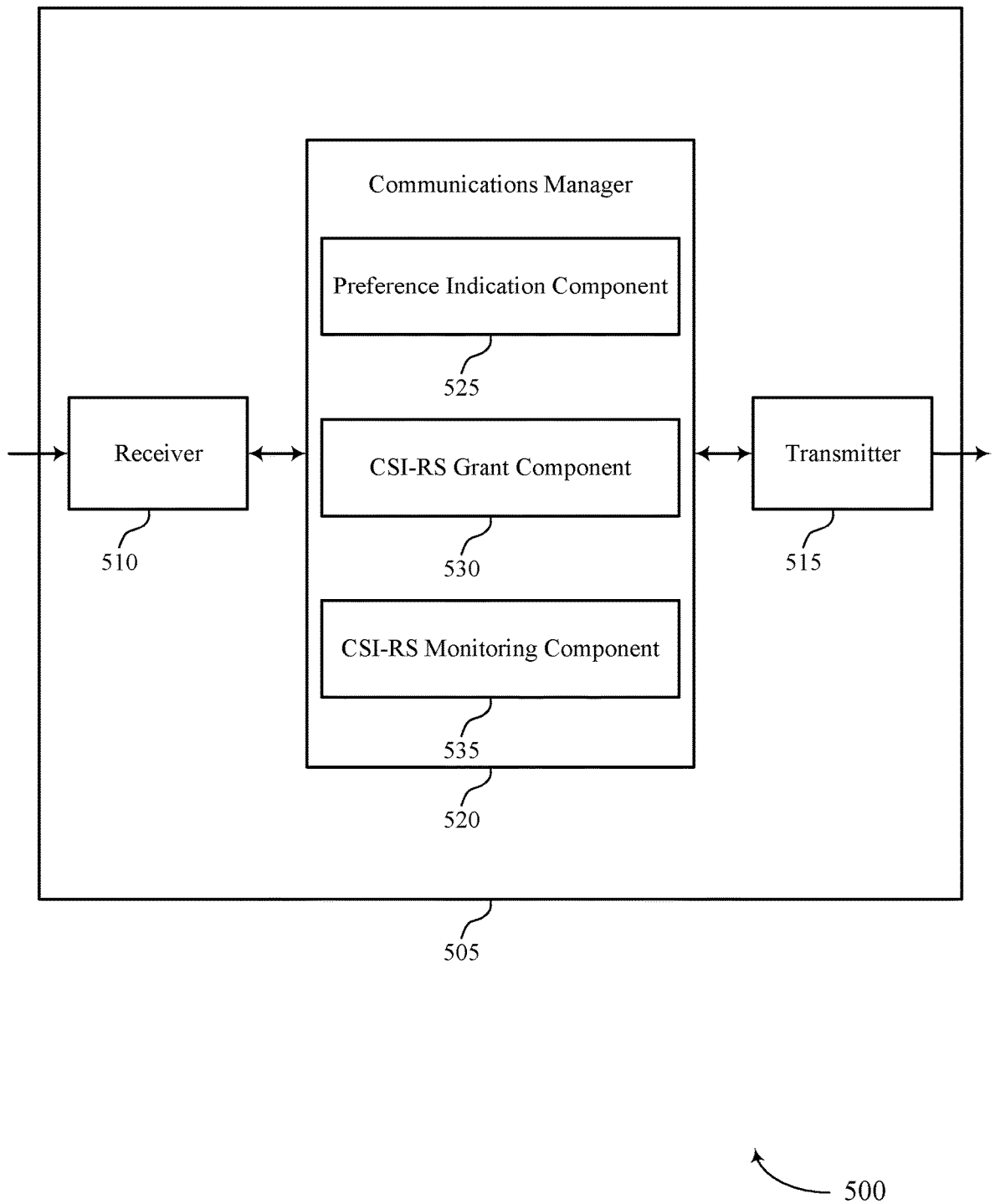

FIG. 5 shows a block diagram 500 of a device 505 that supports techniques for signaling periodic and aperiodic CSI-RS configuration preference in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for signaling periodic and aperiodic CSI-RS configuration preference). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for signaling periodic and aperiodic CSI-RS configuration preference). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for signaling periodic and aperiodic CSI-RS configuration preference as described herein. For example, the communications manager 520 may include a preference indication component 525, a CSI-RS grant component 530, a CSI-RS monitoring component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The preference indication component 525 may be configured as or otherwise support a means for transmitting an indication of a recommendation between a set of periodic CSI-RSs and a set of aperiodic CSI-RSs. The CSI-RS grant component 530 may be configured as or otherwise support a means for receiving control signaling granting the set of aperiodic CSI-RSs or configuring the set of periodic CSI-RSs based on the indication of the recommendation. The CSI-RS monitoring component 535 may be configured as or otherwise support a means for monitoring for the set of aperiodic CSI-RSs or the set of periodic CSI-RSs based on the control signaling.

Figure 6:
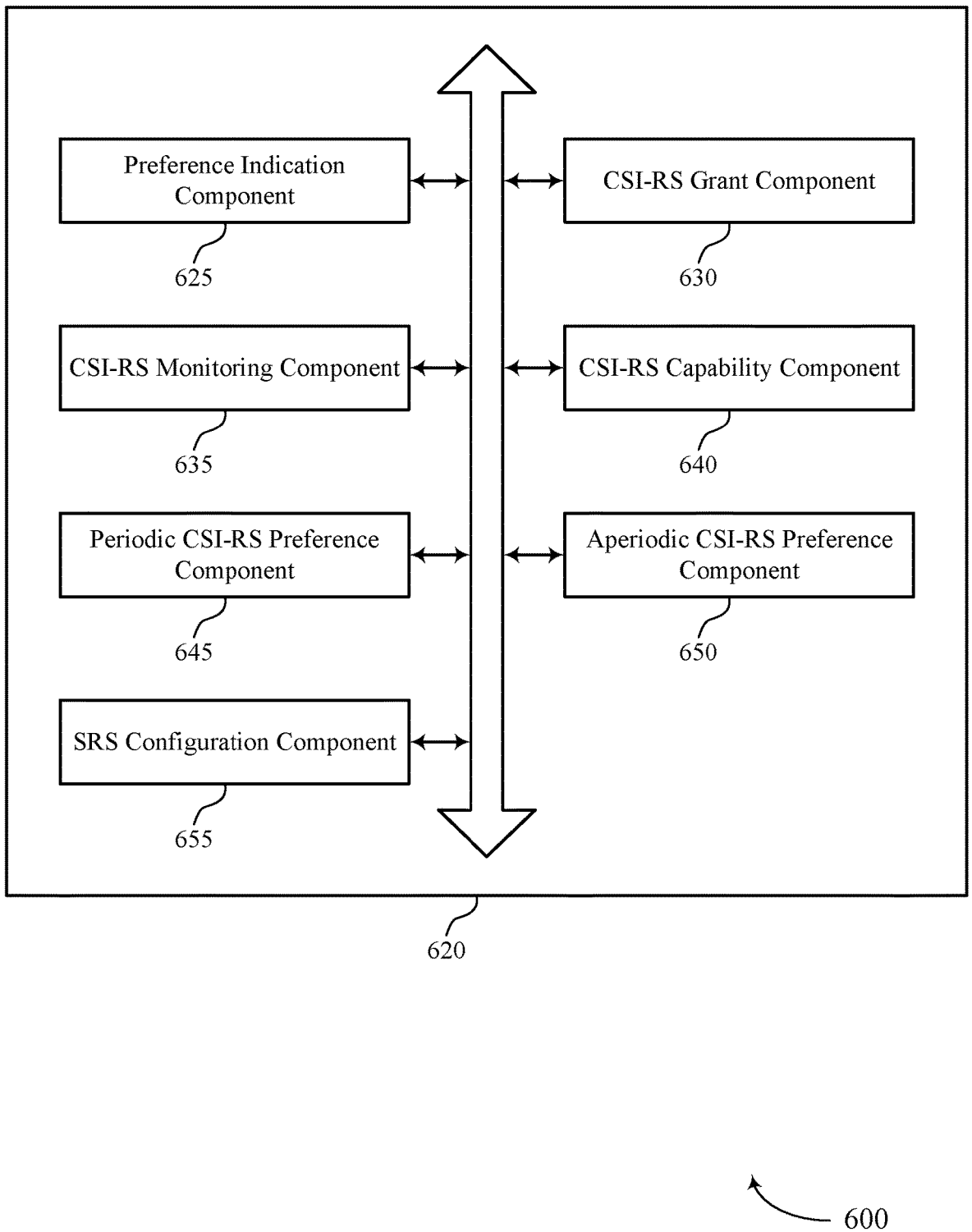
FIG. 6 shows a block diagram of a communications manager that supports techniques for signaling periodic and aperiodic CSI-RS configuration preference in accordance with one or more aspects of the present disclosure.

FIG. 6 shows a block diagram 600 of a communications manager 620 that supports techniques for signaling periodic and aperiodic CSI-RS configuration preference in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for signaling periodic and aperiodic CSI-RS configuration preference as described herein. For example, the communications manager 620 may include a preference indication component 625, a CSI-RS grant component 630, a CSI-RS monitoring component 635, a CSI-RS capability component 640, a periodic CSI-RS preference component 645, an aperiodic CSI-RS preference component 650, an SRS configuration component 655, or any combination thereof. Each of these components may communicate, directly or indirectly, with one another (e.g., via one or more buses).

The communications manager 620 may support wireless communications at a UE in accordance with examples as disclosed herein. The preference indication component 625 may be configured as or otherwise support a means for transmitting an indication of a recommendation between a set of periodic CSI-RSs and a set of aperiodic CSI-RSs. The CSI-RS grant component 630 may be configured as or otherwise support a means for receiving control signaling granting the set of aperiodic CSI-RSs or configuring the set of periodic CSI-RSs based on the indication of the recommendation. The CSI-RS monitoring component 635 may be configured as or otherwise support a means for monitoring for the set of aperiodic CSI-RSs or the set of periodic CSI-RSs based on the control signaling.

In some examples, the CSI-RS capability component 640 may be configured as or otherwise support a means for transmitting a message indicating a UE capability associated with adaptive beam weight estimation.

In some examples, the UE capability is based on a power availability of the UE, a thermal overhead associated with the UE, mobility conditions of the UE, channel conditions for a wireless channel between the UE and a network entity, or any combination thereof.

In some examples, the UE capability includes a first capability to perform beam weight estimation for a set of multiple antenna elements of an antenna group, a second capability to perform beam weight estimation for antenna elements of the set of multiple antenna elements individually, or both.

In some examples, the UE capability is based on a quantization mapping in a range of estimation error.

In some examples, the recommendation between the set of periodic CSI-RSs and the set of aperiodic CSI-RSs is based on the UE capability.

In some examples, to support transmitting the indication of the recommendation, the periodic CSI-RS preference component 645 may be configured as or otherwise support a means for indicating a quantity of reference signals for the set of periodic CSI-RSs, a periodicity for the set of periodic CSI-RSs, frequency resources for the set of periodic CSI-RSs, or any combination thereof.

In some examples, to support transmitting the indication of the recommendation, the aperiodic CSI-RS preference component 650 may be configured as or otherwise support a means for indicating a quantity of reference signals for the set of aperiodic CSI-RSs, frequency resources for the set of aperiodic CSI-RSs, or both.

In some examples, the SRS configuration component 655 may be configured as or otherwise support a means for receiving a grant for uplink resources for a set of sounding reference signals (SRSs) based on the indication of the recommendation of the set of aperiodic CSI-RSs. In some examples, the SRS configuration component 655 may be configured as or otherwise support a means for transmitting the set of sounding reference signals on the uplink resources based on the grant.

Figure 7:
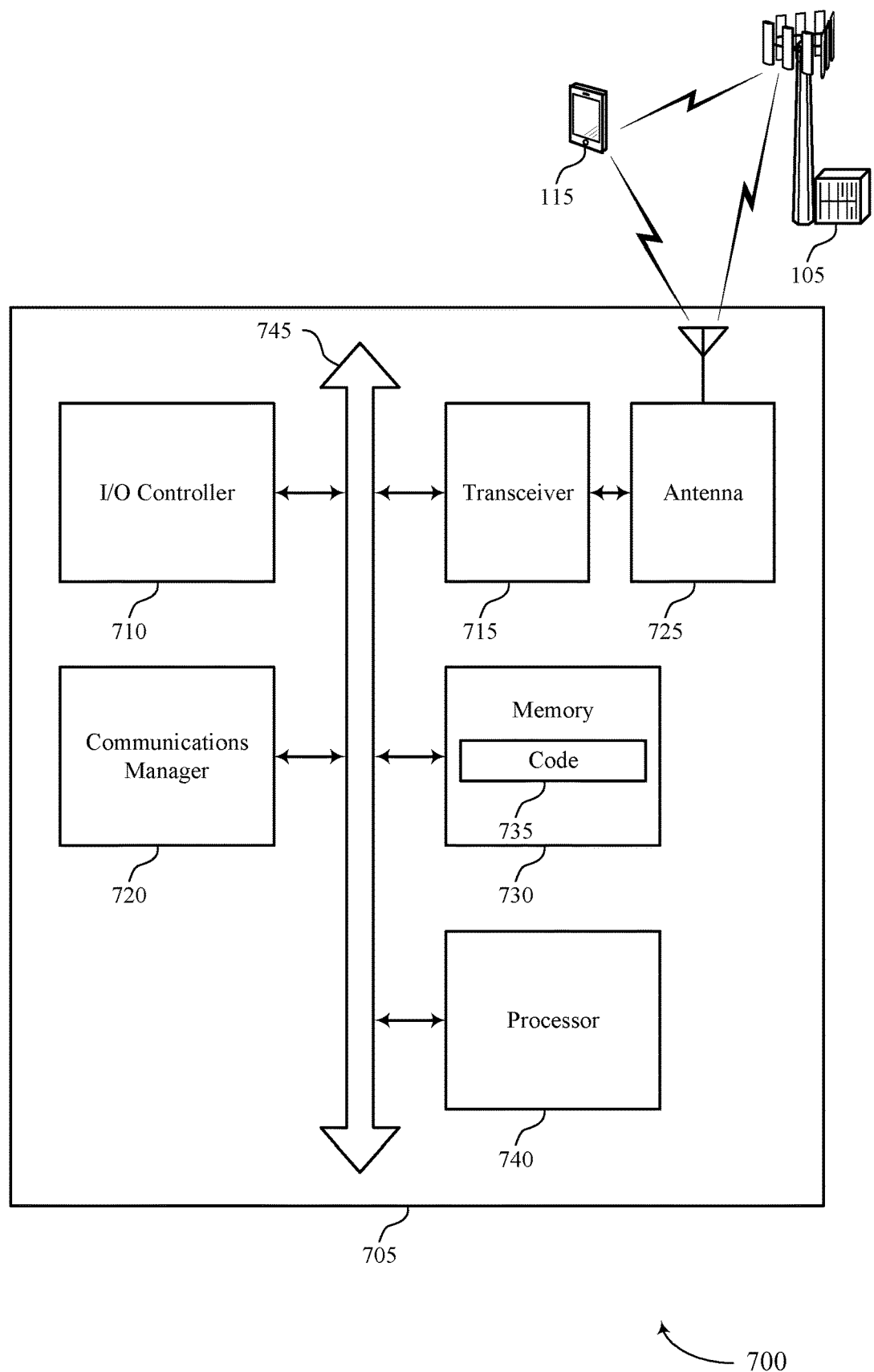
FIG. 7 shows a diagram of a system including a device that supports techniques for signaling periodic and aperiodic CSI-RS configuration preference in accordance with one or more aspects of the present disclosure.

FIG. 7 shows a diagram of a system 700 including a device 705 that supports techniques for signaling periodic and aperiodic CSI-RS configuration preference in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for signaling periodic and aperiodic CSI-RS configuration preference). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for transmitting an indication of a recommendation between a set of periodic CSI-RSs and a set of aperiodic CSI-RSs. The communications manager 720 may be configured as or otherwise support a means for receiving control signaling granting the set of aperiodic CSI-RSs or configuring the set of periodic CSI-RSs based on the indication of the recommendation. The communications manager 720 may be configured as or otherwise support a means for monitoring for the set of aperiodic CSI-RSs or the set of periodic CSI-RSs based on the control signaling.

By including or configuring the communications manager 720 in accordance with examples as described herein, the device 705 may support techniques for reduced power consumption, improved coordination between devices, and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for signaling periodic and aperiodic CSI-RS configuration preference as described herein, or the processor 740 and the memory 730 may be otherwise configured to perform or support such operations.

Figure 8:
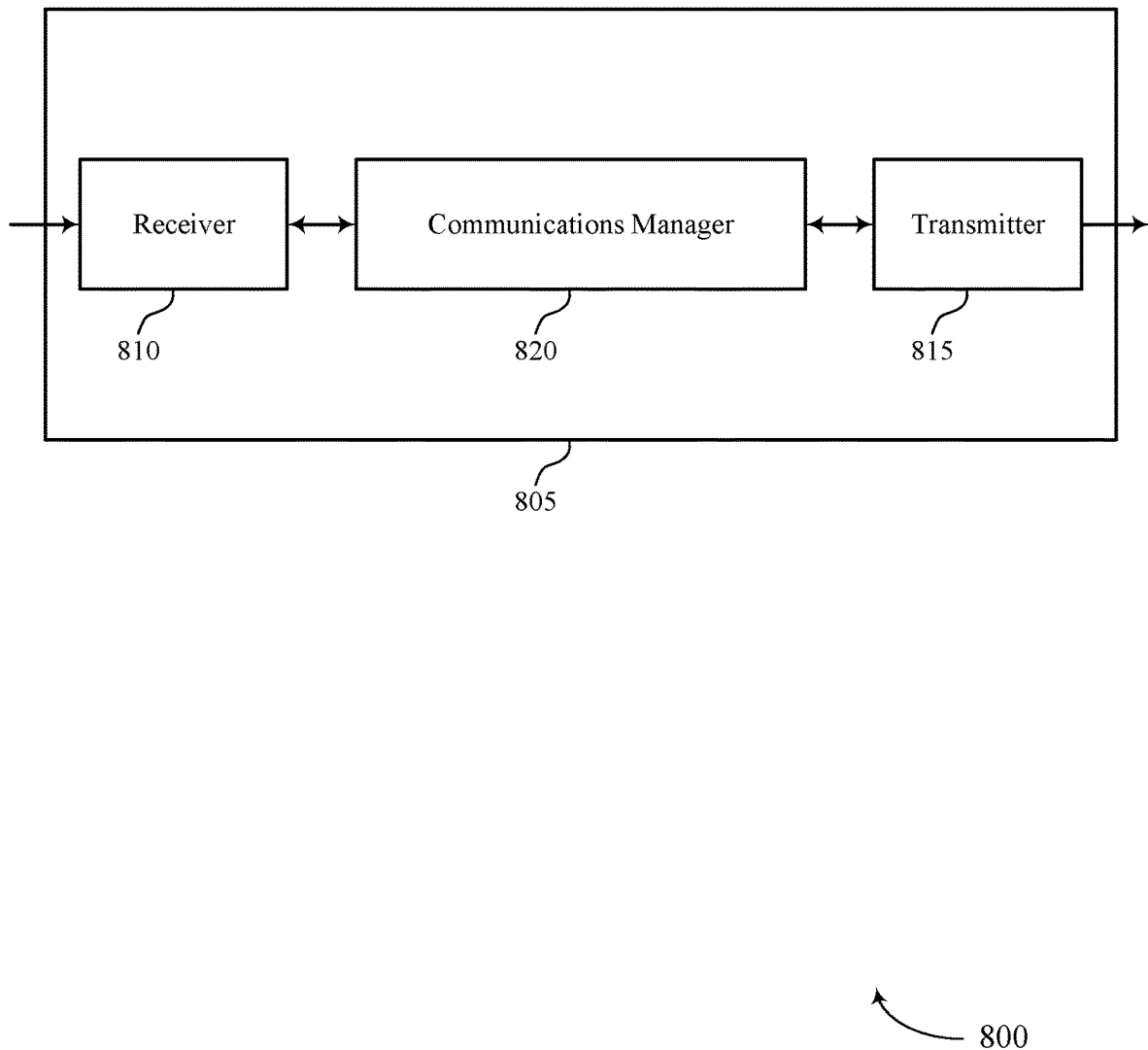
FIGS. 8 and 9 show block diagrams of devices that support techniques for signaling periodic and aperiodic CSI-RS configuration preference in accordance with one or more aspects of the present disclosure.

FIG. 8 shows a block diagram 800 of a device 805 that supports techniques for signaling periodic and aperiodic CSI-RS configuration preference in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for signaling periodic and aperiodic CSI-RS configuration preference as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for receiving an indication of a UE recommendation between a set of periodic CSI-RSs and a set of aperiodic CSI-RSs. The communications manager 820 may be configured as or otherwise support a means for transmitting control signaling granting the set of aperiodic CSI-RSs or configuring the set of periodic CSI-RSs based on the indication of the UE recommendation. The communications manager 820 may be configured as or otherwise support a means for transmitting the set of aperiodic CSI-RSs or the set of periodic CSI-RSs based on the control signaling.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

Figure 9:
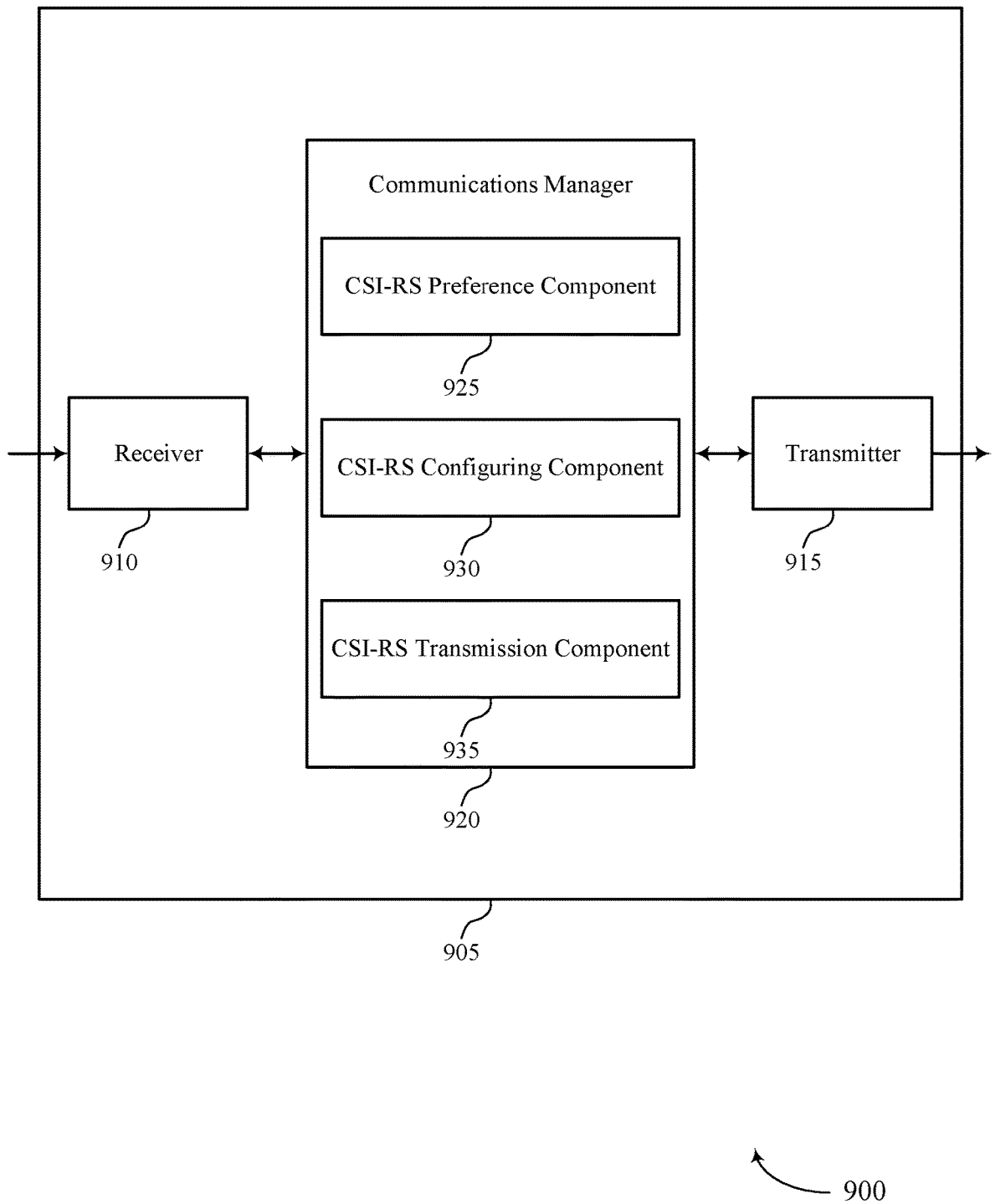

FIG. 9 shows a block diagram 900 of a device 905 that supports techniques for signaling periodic and aperiodic CSI-RS configuration preference in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for signaling periodic and aperiodic CSI-RS configuration preference as described herein. For example, the communications manager 920 may include a CSI-RS preference component 925, a CSI-RS configuring component 930, a CSI-RS transmission component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The CSI-RS preference component 925 may be configured as or otherwise support a means for receiving an indication of a UE recommendation between a set of periodic CSI-RSs and a set of aperiodic CSI-RSs. The CSI-RS configuring component 930 may be configured as or otherwise support a means for transmitting control signaling granting the set of aperiodic CSI-RSs or configuring the set of periodic CSI-RSs based on the indication of the UE recommendation. The CSI-RS transmission component 935 may be configured as or otherwise support a means for transmitting the set of aperiodic CSI-RSs or the set of periodic CSI-RSs based on the control signaling.

Figure 10:
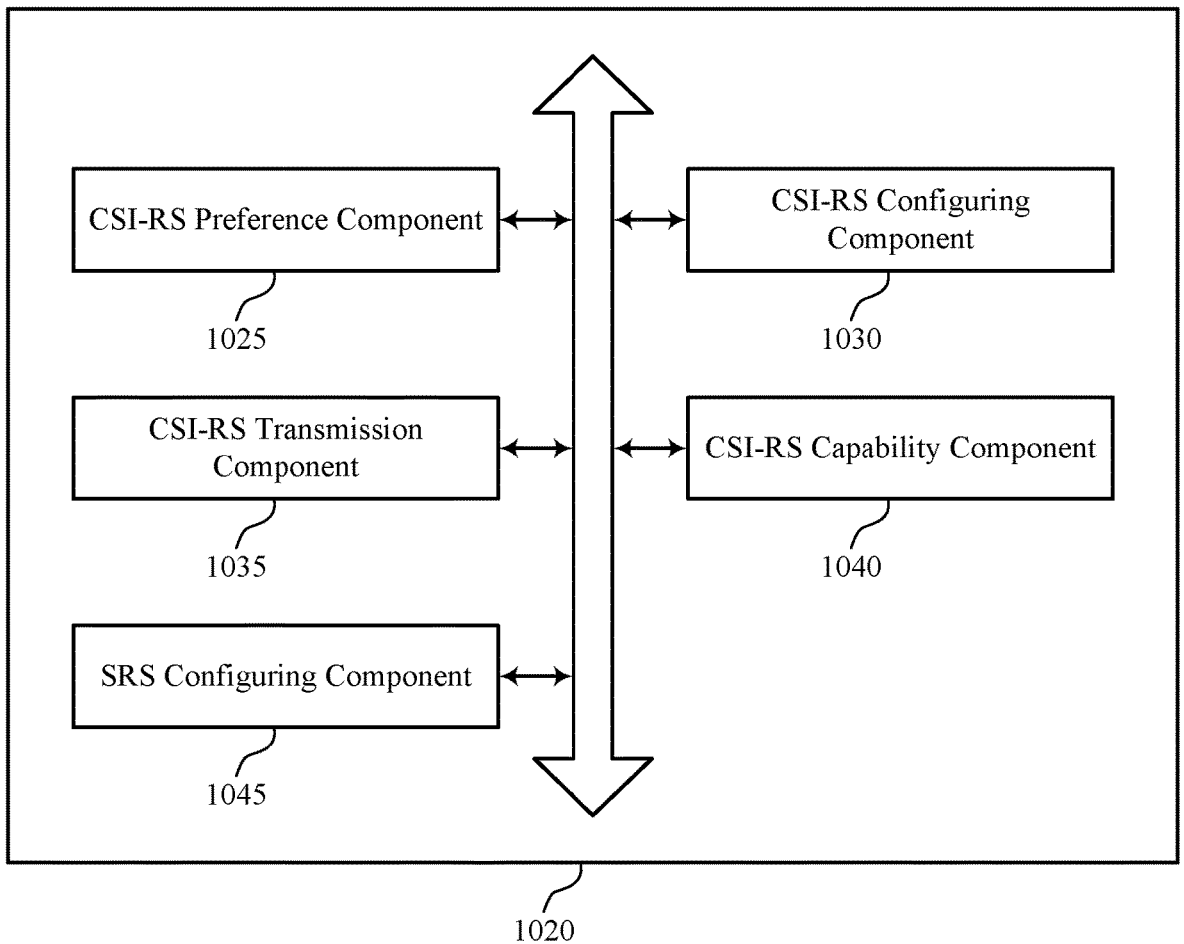
FIG. 10 shows a block diagram of a communications manager that supports techniques for signaling periodic and aperiodic CSI-RS configuration preference in accordance with one or more aspects of the present disclosure.

FIG. 10 shows a block diagram 1000 of a communications manager 1020 that supports techniques for signaling periodic and aperiodic CSI-RS configuration preference in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for signaling periodic and aperiodic CSI-RS configuration preference as described herein. For example, the communications manager 1020 may include a CSI-RS preference component 1025, a CSI-RS configuring component 1030, a CSI-RS transmission component 1035, a CSI-RS capability component 1040, an SRS configuring component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The CSI-RS preference component 1025 may be configured as or otherwise support a means for receiving an indication of a UE recommendation between a set of periodic CSI-RSs and a set of aperiodic CSI-RSs. The CSI-RS configuring component 1030 may be configured as or otherwise support a means for transmitting control signaling granting the set of aperiodic CSI-RSs or configuring the set of periodic CSI-RSs based on the indication of the UE recommendation. The CSI-RS transmission component 1035 may be configured as or otherwise support a means for transmitting the set of aperiodic CSI-RSs or the set of periodic CSI-RSs based on the control signaling.

In some examples, the CSI-RS capability component 1040 may be configured as or otherwise support a means for receiving a message indicating a UE capability associated with adaptive beam weight estimation.

In some examples, the UE capability is based on a power availability of a UE, a thermal overhead associated with the UE, mobility conditions of the UE, channel conditions for a wireless channel between the UE and the network entity, or any combination thereof.

In some examples, the UE capability includes a first capability to perform beam weight estimation for a set of multiple antenna elements of an antenna group, a second capability to perform beam weight estimation for antenna elements of the set of multiple antenna elements individually, or both. In some examples, the UE capability is based on a quantization mapping in a range of estimation error. In some examples, the UE recommendation for the set of periodic CSI-RSs or the set of aperiodic CSI-RSs is based on the UE capability.

In some examples, to support receiving the indication of the UE recommendation, the CSI-RS preference component 1025 may be configured as or otherwise support a means for receiving an indication of a quantity of reference signals for the set of periodic CSI-RSs, a periodicity for the set of periodic CSI-RSs, frequency resources for the set of periodic CSI-RSs, or any combination thereof.

In some examples, to support receiving the indication of the UE recommendation, the CSI-RS preference component 1025 may be configured as or otherwise support a means for receiving an indication of a quantity of reference signals for the set of aperiodic CSI-RSs, frequency resources for the set of aperiodic CSI-RSs, or both.

In some examples, the SRS configuring component 1045 may be configured as or otherwise support a means for transmitting a grant for uplink resources for one or more sounding reference signals (SRSs) based on the indication of the UE recommendation for the set of aperiodic CSI-RSs. In some examples, the SRS configuring component 1045 may be configured as or otherwise support a means for receiving the one or more sounding reference signals on the uplink resources based on the grant.

Figure 11:
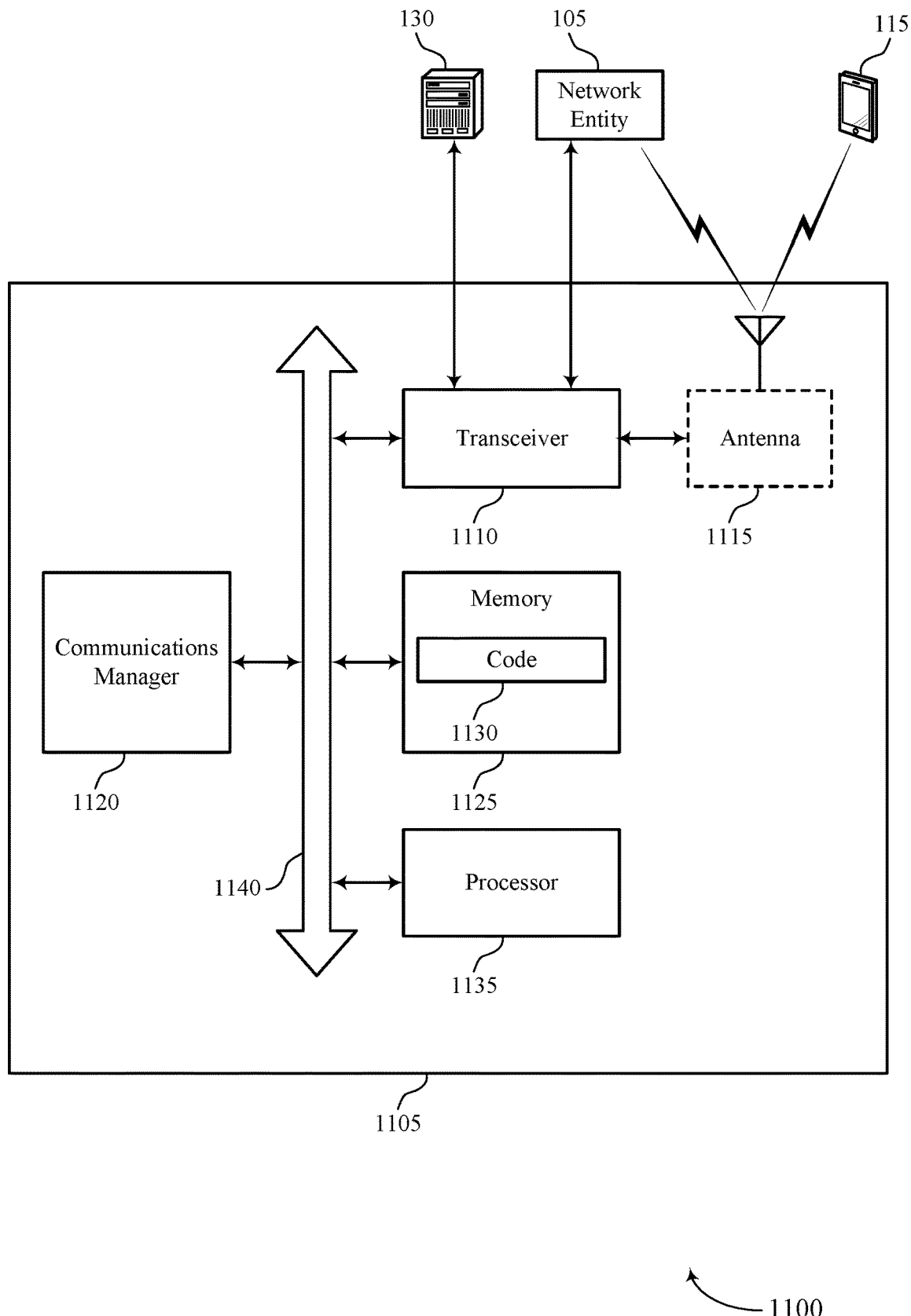
FIG. 11 shows a diagram of a system including a device that supports techniques for signaling periodic and aperiodic CSI-RS configuration preference in accordance with one or more aspects of the present disclosure.

FIG. 11 shows a diagram of a system 1100 including a device 1105 that supports techniques for signaling periodic and aperiodic CSI-RS configuration preference in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for signaling periodic and aperiodic CSI-RS configuration preference). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for receiving an indication of a UE recommendation between a set of periodic CSI-RSs and a set of aperiodic CSI-RSs. The communications manager 1120 may be configured as or otherwise support a means for transmitting control signaling granting the set of aperiodic CSI-RSs or configuring the set of periodic CSI-RSs based on the indication of the UE recommendation. The communications manager 1120 may be configured as or otherwise support a means for transmitting the set of aperiodic CSI-RSs or the set of periodic CSI-RSs based on the control signaling.

By including or configuring the communications manager 1120 in accordance with examples as described herein, the device 1105 may support techniques for more efficient utilization of communication resources and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for signaling periodic and aperiodic CSI-RS configuration preference as described herein, or the processor 1135 and the memory 1125 may be otherwise configured to perform or support such operations.

Figure 12:
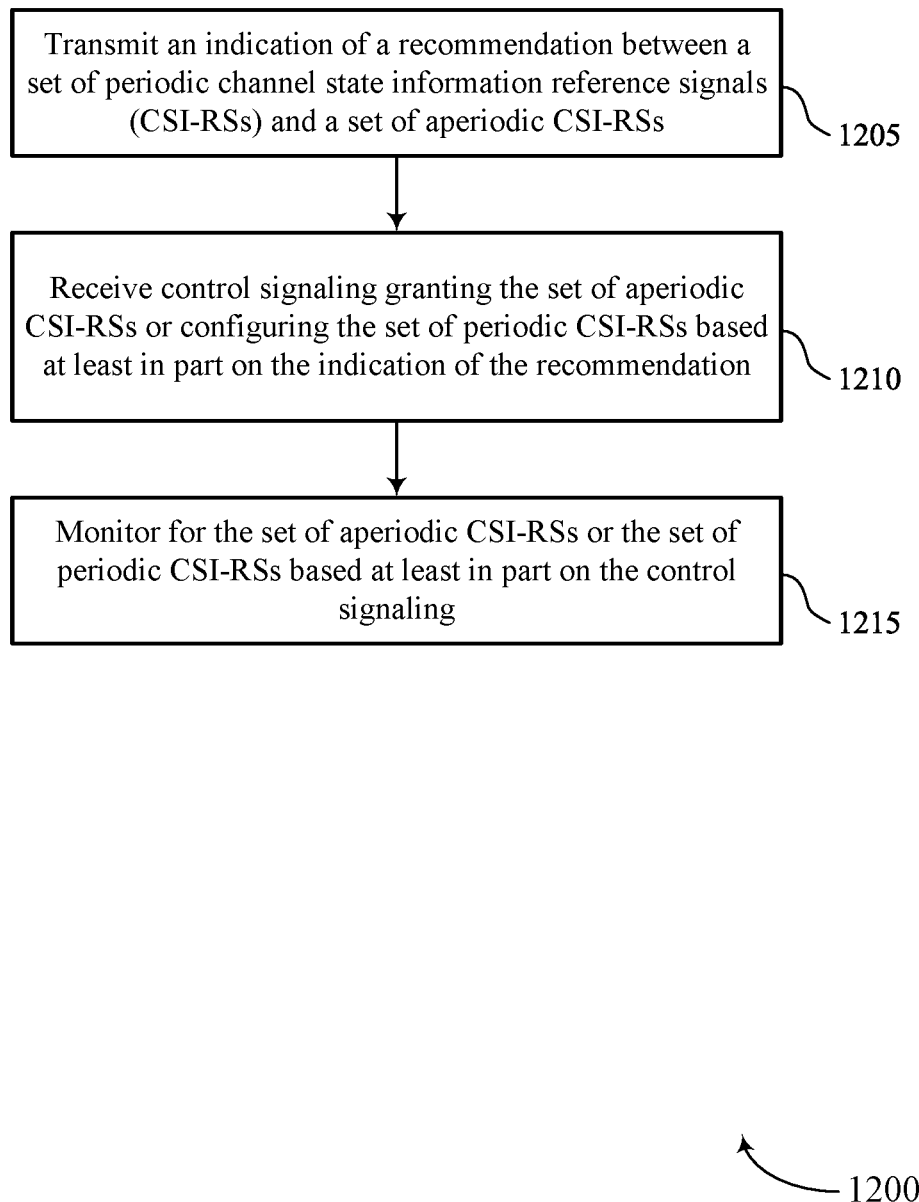
FIGS. 12 and 13 show flowcharts illustrating methods that support techniques for signaling periodic and aperiodic CSI-RS configuration preference in accordance with one or more aspects of the present disclosure.

FIG. 12 shows a flowchart illustrating a method 1200 that supports techniques for signaling periodic and aperiodic CSI-RS configuration preference in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting an indication of a recommendation between a set of periodic CSI-RSs and a set of aperiodic CSI-RSs. The operations of 1205 may be performed in accordance with examples as disclosed herein. In some examples, aspects of the operations of 1205 may be performed by a preference indication component 625 as described with reference to FIG. 6.

At 1210, the method may include receiving control signaling granting the set of aperiodic CSI-RSs or configuring the set of periodic CSI-RSs based on the indication of the recommendation. The operations of 1210 may be performed in accordance with examples as disclosed herein. In some examples, aspects of the operations of 1210 may be performed by a CSI-RS grant component 630 as described with reference to FIG. 6.

At 1215, the method may include monitoring for the set of aperiodic CSI-RSs or the set of periodic CSI-RSs based on the control signaling. The operations of 1215 may be performed in accordance with examples as disclosed herein. In some examples, aspects of the operations of 1215 may be performed by a CSI-RS monitoring component 635 as described with reference to FIG. 6.

Figure 13:
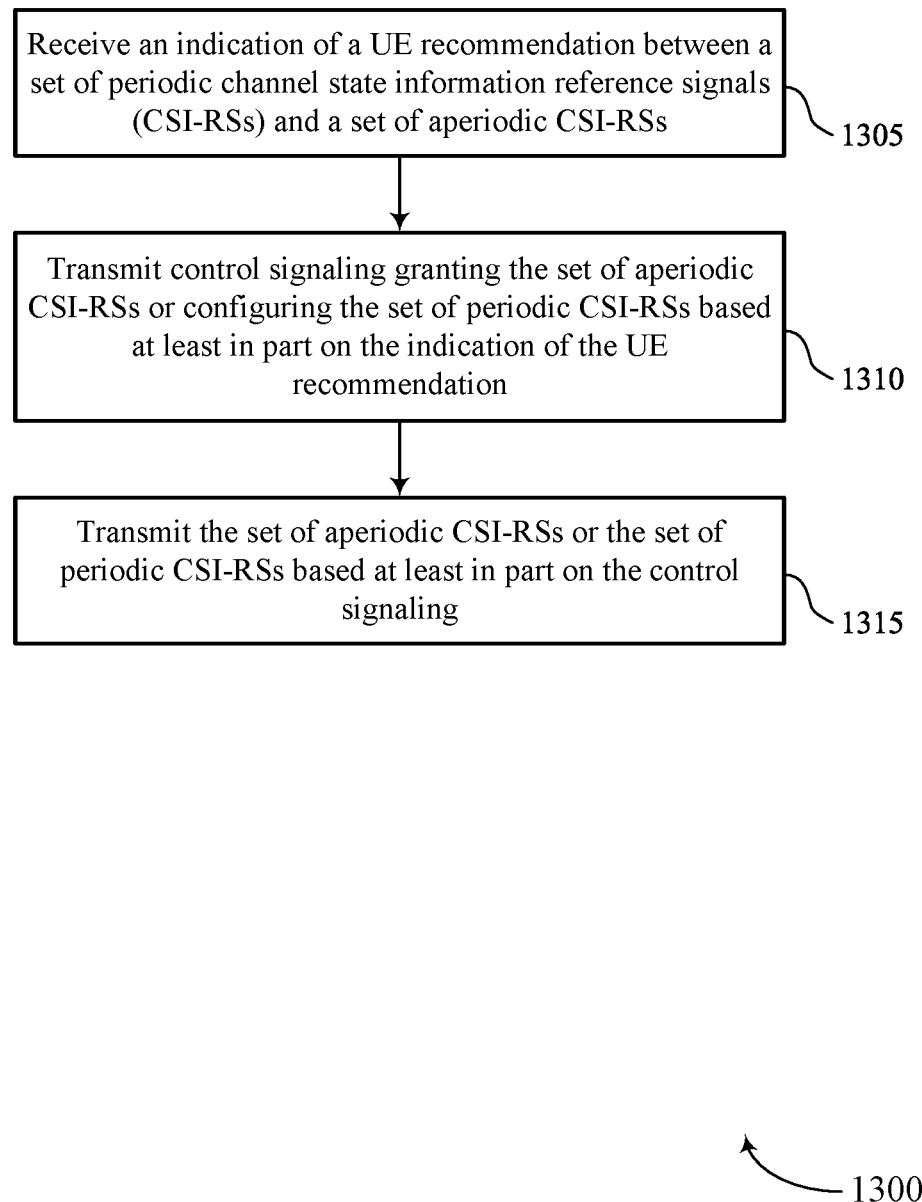

FIG. 13 shows a flowchart illustrating a method 1300 that supports techniques for signaling periodic and aperiodic CSI-RS configuration preference in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include receiving an indication of a UE recommendation between a set of periodic CSI-RSs and a set of aperiodic CSI-RSs. The operations of 1305 may be performed in accordance with examples as disclosed herein. In some examples, aspects of the operations of 1305 may be performed by a CSI-RS preference component 1025 as described with reference to FIG. 10.

At 1310, the method may include transmitting control signaling granting the set of aperiodic CSI-RSs or configuring the set of periodic CSI-RSs based on the indication of the UE recommendation. The operations of 1310 may be performed in accordance with examples as disclosed herein. In some examples, aspects of the operations of 1310 may be performed by a CSI-RS configuring component 1030 as described with reference to FIG. 10.

At 1315, the method may include transmitting the set of aperiodic CSI-RSs or the set of periodic CSI-RSs based on the control signaling. The operations of 1315 may be performed in accordance with examples as disclosed herein. In some examples, aspects of the operations of 1315 may be performed by a CSI-RS transmission component 1035 as described with reference to FIG. 10.

The following provides an overview of aspects of the present disclosure:

Aspect 1: A method for wireless communications at a UE, comprising: transmitting an indication of a recommendation between a set of periodic channel state information reference signals (CSI-RSs) and a set of aperiodic CSI-RSs; receiving control signaling granting the set of aperiodic CSI-RSs or configuring the set of periodic CSI-RSs based at least in part on the indication of the recommendation; and monitoring for the set of aperiodic CSI-RSs or the set of periodic CSI-RSs based at least in part on the control signaling.

Aspect 2: The method of aspect 1, further comprising: transmitting a message indicating a UE capability associated with adaptive beam weight estimation.

Aspect 3: The method of aspect 2, wherein the UE capability is based at least in part on a power availability of the UE, a thermal overhead associated with the UE, mobility conditions of the UE, channel conditions for a wireless channel between the UE and a network entity, or any combination thereof.

Aspect 4: The method of any of aspects 2 through 3, wherein the UE capability includes a first capability to perform beam weight estimation for a plurality of antenna elements of an antenna group, a second capability to perform beam weight estimation for antenna elements of the plurality of antenna elements individually, or both.

Aspect 5: The method of any of aspects 2 through 4, wherein the UE capability is based at least in part on a quantization mapping in a range of estimation error.

Aspect 6: The method of any of aspects 2 through 5, wherein the recommendation between the set of periodic CSI-RSs and the set of aperiodic CSI-RSs is based at least in part on the UE capability.

Aspect 7: The method of any of aspects 1 through 6, wherein transmitting the indication of the recommendation comprises: indicating a quantity of reference signals for the set of periodic CSI-RSs, a periodicity for the set of periodic CSI-RSs, frequency resources for the set of periodic CSI-RSs, or any combination thereof.

Aspect 8: The method of any of aspects 1 through 7, wherein transmitting the indication of the recommendation comprises: indicating a quantity of reference signals for the set of aperiodic CSI-RSs, frequency resources for the set of aperiodic CSI-RSs, or both.

Aspect 9: The method of any of aspects 1 through 8, further comprising: receiving a grant for uplink resources for a set of sounding reference signals (SRSs) based at least in part on the indication of the recommendation of the set of aperiodic CSI-RSs; and transmitting the set of sounding reference signals on the uplink resources based at least in part on the grant.

Aspect 10: A method for wireless communications at a network entity, comprising: receiving an indication of a UE recommendation between a set of periodic channel state information reference signals (CSI-RSs) and a set of aperiodic CSI-RSs; transmitting control signaling granting the set of aperiodic CSI-RSs or configuring the set of periodic CSI-RSs based at least in part on the indication of the UE recommendation; and transmitting the set of aperiodic CSI-RSs or the set of periodic CSI-RSs based at least in part on the control signaling.

Aspect 11: The method of aspect 10, further comprising: receiving a message indicating a UE capability associated with adaptive beam weight estimation.

Aspect 12: The method of aspect 11, wherein the UE capability is based at least in part on a power availability of a UE, a thermal overhead associated with the UE, mobility conditions of the UE, channel conditions for a wireless channel between the UE and the network entity, or any combination thereof.

Aspect 13: The method of any of aspects 11 through 12, wherein the UE capability includes a first capability to perform beam weight estimation for a plurality of antenna elements of an antenna group, a second capability to perform beam weight estimation for antenna elements of the plurality of antenna elements individually, or both.

Aspect 14: The method of any of aspects 11 through 13, wherein the UE capability is based at least in part on a quantization mapping in a range of estimation error.

Aspect 15: The method of any of aspects 11 through 14, wherein the UE recommendation for the set of periodic CSI-RSs or the set of aperiodic CSI-RSs is based at least in part on the UE capability.

Aspect 16: The method of any of aspects 10 through 15, wherein receiving the indication of the UE recommendation comprises: receiving an indication of a quantity of reference signals for the set of periodic CSI-RSs, a periodicity for the set of periodic CSI-RSs, frequency resources for the set of periodic CSI-RSs, or any combination thereof.

Aspect 17: The method of any of aspects 10 through 16, wherein receiving the indication of the UE recommendation comprises: receiving an indication of a quantity of reference signals for the set of aperiodic CSI-RSs, frequency resources for the set of aperiodic CSI-RSs, or both.

Aspect 18: The method of any of aspects 10 through 17, further comprising: transmitting a grant for uplink resources for one or more sounding reference signals (SRSs) based at least in part on the indication of the UE recommendation for the set of aperiodic CSI-RSs; and receiving the one or more sounding reference signals on the uplink resources based at least in part on the grant.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a network entity, comprising a processor; memory coupled with the processor; and instructions stored in the memory and executable by the processor to cause the apparatus to perform a method of any of aspects 10 through 18.

Aspect 23: An apparatus for wireless communications at a network entity, comprising at least one means for performing a method of any of aspects 10 through 18.

Aspect 24: A non-transitory computer-readable medium storing code for wireless communications at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor;
   at least one memory coupled with the at least one processor; and
   instructions stored in the at least one memory and executable by the at least one processor to cause the apparatus to:
      transmit a message indicating a UE capability associated with adaptive beam weight estimation, the UE capability including a first capability for the UE to perform beam weight estimation for a plurality of antenna elements of an antenna group in accordance with a periodic channel state information reference signal (CSI-RS) configuration, a second capability for the UE to perform beam weight estimation for antenna elements of the plurality of antenna elements individually in accordance with an aperiodic CSI-RS configuration, or both;
      transmit an indication of a recommended CSI-RS configuration, the recommended CSI-RS configuration selected from a set of CSI-RS configurations that comprises the periodic CSI-RS configuration and the aperiodic CSI-RS configuration, based at least in part on the message indicating the UE capability associated with adaptive beam weight estimation;
      receive control signaling granting a set of aperiodic CSI-RSs or configuring a set of periodic CSI-RSs in accordance with the recommended CSI-RS configuration; and
      monitor for the set of aperiodic CSI-RSs or the set of periodic CSI-RSs based at least in part on the control signaling.

2. The apparatus of claim 1, wherein the UE capability is based at least in part on a power availability of the UE, a thermal overhead associated with the UE, mobility conditions of the UE, channel conditions for a wireless channel between the UE and a network entity, or any combination thereof.

3. The apparatus of claim 1, wherein the instructions are further executable by the at least one processor to cause the apparatus to select the recommended CSI-RS configuration is based at least in part on the UE capability.

4. The apparatus of claim 1, wherein the instructions to transmit the indication of the recommended CSI-RS configuration are executable by the at least one processor to cause the apparatus to:
   indicate a quantity of reference signals for the set of periodic CSI-RSs, a periodicity for the set of periodic CSI-RSs, frequency resources for the set of periodic CSI-RSs, or any combination thereof.

5. The apparatus of claim 1, wherein the instructions to transmit the indication of the recommended CSI-RS configuration are executable by the at least one processor to cause the apparatus to:
   indicate a quantity of reference signals for the set of aperiodic CSI-RSs, frequency resources for the set of aperiodic CSI-RSs, or both.

6. The apparatus of claim 1, wherein the instructions are further executable by the at least one processor to cause the apparatus to:
   receive a grant for uplink resources for a set of sounding reference signals (SRSs) based at least in part on recommended CSI-RS configuration corresponding to the set of aperiodic CSI-RSs; and
   transmit the set of sounding reference signals on the uplink resources based at least in part on the grant.

7. An apparatus for wireless communications at a network entity, comprising:
  at least one processor;
  at least one memory coupled with the at least one processor; and
  instructions stored in the at least one memory and executable by the at least one processor to cause the apparatus to:
    receive a message indicating a user equipment (UE) capability associated with adaptive beam weight estimation, the UE capability including a first capability for a UE to perform beam weight estimation for a plurality of antenna elements of an antenna group in accordance with a periodic channel state information reference signal (CSI-RS) configuration, a second capability for the UE to perform beam weight estimation for antenna elements of the plurality of antenna elements individually in accordance with an aperiodic CSI-RS configuration, or both;
    receive an indication of a recommended CSI-RS configuration, the recommended CSI-RS configuration selected from a set of CSI-RS configurations that comprises the periodic CSI-RS configuration and the aperiodic CSI-RS configuration, based at least in part on the message indicating the UE capability associated with adaptive beam weight estimation;
    transmit control signaling granting a set of aperiodic CSI-RSs or configuring a set of periodic CSI-RSs in accordance with the recommended CSI-RS configuration; and
    transmit the set of aperiodic CSI-RSs or the set of periodic CSI-RSs based at least in part on the control signaling.

8. The apparatus of claim 7, wherein the UE capability is based at least in part on a power availability of the UE, a thermal overhead associated with the UE, mobility conditions of the UE, channel conditions for a wireless channel between the UE and the network entity, or any combination thereof.

9. The apparatus of claim 7, wherein the recommended CSI-RS configuration is based at least in part on the UE capability.

10. The apparatus of claim 7, wherein the instructions to receive the indication of the recommended CSI-RS configuration are executable by the at least one processor to cause the apparatus to:
  receive an indication of a quantity of reference signals for the set of periodic CSI-RSs, a periodicity for the set of periodic CSI-RSs, frequency resources for the set of periodic CSI-RSs, or any combination thereof.

11. The apparatus of claim 7, wherein the instructions to receive the indication of the recommended CSI-RS configuration are executable by the at least one processor to cause the apparatus to:
  receive an indication of a quantity of reference signals for the set of aperiodic CSI-RSs, frequency resources for the set of aperiodic CSI-RSs, or both.

12. The apparatus of claim 7, wherein the instructions are further executable by the at least one processor to cause the apparatus to:
  transmit a grant for uplink resources for one or more sounding reference signals (SRSs) based at least in part on the recommended CSI-RS configuration corresponding to the set of aperiodic CSI-RSs; and
  receive the one or more sounding reference signals on the uplink resources based at least in part on the grant.

13. A method for wireless communications at a user equipment (UE), comprising:
  transmitting a message indicating a UE capability associated with adaptive beam weight estimation, the UE capability including a first capability for the UE to perform beam weight estimation for a plurality of antenna elements of an antenna group in accordance with a periodic channel state information reference signal (CSI-RS) configuration, a second capability for the UE to perform beam weight estimation for antenna elements of the plurality of antenna elements individually in accordance with an aperiodic CSI-RS configuration, or both;
  transmitting an indication of a recommended CSI-RS configuration, the recommended CSI-RS configuration selected from a set of CSI-RS configurations that comprises the periodic CSI-RS configuration and the aperiodic CSI-RS configuration, based at least in part on the message indicating the UE capability associated with adaptive beam weight estimation;
  receiving control signaling granting a set of aperiodic CSI-RSs or configuring a set of periodic CSI-RSs in accordance with the recommended CSI-RS configuration; and
  monitoring for the set of aperiodic CSI-RSs or the set of periodic CSI-RSs based at least in part on the control signaling.

14. The method of claim 13, wherein the UE capability is based at least in part on a power availability of the UE, a thermal overhead associated with the UE, mobility conditions of the UE, channel conditions for a wireless channel between the UE and a network entity, or any combination thereof.

15. The method of claim 13, wherein the recommended CSI-RS configuration is selected based at least in part on the UE capability.

16. The method of claim 13, wherein transmitting the indication of the recommended CSI-RS configuration comprises:
  indicating a quantity of reference signals for the set of periodic CSI-RSs, a periodicity for the set of periodic CSI-RSs, frequency resources for the set of periodic CSI-RSs, or any combination thereof.

17. The method of claim 13, wherein transmitting the indication of the recommended CSI-RS configuration comprises:
  indicating a quantity of reference signals for the set of aperiodic CSI-RSs, frequency resources for the set of aperiodic CSI-RSs, or both.

18. The method of claim 13, further comprising:
  receiving a grant for uplink resources for a set of sounding reference signals (SRSs) based at least in part on the recommended CSI-RS configuration corresponding to the set of aperiodic CSI-RSs; and
  transmitting the set of sounding reference signals on the uplink resources based at least in part on the grant.

19. A method for wireless communications at a network entity, comprising:
  receiving a message indicating a user equipment (UE) capability associated with adaptive beam weight estimation, the UE capability including a first capability for a UE to perform beam weight estimation for a plurality of antenna elements of an antenna group in accordance with a periodic channel state information reference signal (CSI-RS) configuration, a second capability for the UE to perform beam weight estimation for antenna elements of the plurality of antenna elements individually in accordance with an aperiodic CSI-RS configuration, or both;

receiving an indication of a recommended CSI-RS configuration, the recommended CSI-RS configuration selected from a set of CSI-RS configurations that comprises the periodic CSI-RS configuration and the aperiodic CSI-RS configuration based at least in part on the message indicating the UE capability associated with adaptive beam weight estimation;

transmitting control signaling granting a set of aperiodic CSI-RSs or configuring a set of periodic CSI-RSs in accordance with the recommended CSI-RS configuration; and transmitting the set of aperiodic CSI-RSs or the set of periodic CSI-RSs based at least in part on the control signaling.

20. The method of claim 19, wherein the UE capability is based at least in part on a power availability of the UE, a thermal overhead associated with the UE, mobility conditions of the UE, channel conditions for a wireless channel between the UE and the network entity, or any combination thereof.

* * * * *